US011004281B2

(12) United States Patent
Castro Duran et al.

(10) Patent No.: US 11,004,281 B2
(45) Date of Patent: May 11, 2021

(54) ROADSIDE ASSISTANCE WITH UNMANNED AERIAL VEHICLE (71) Applicant: Ford Global Technologies, LLC, Dearborn, MI (US)

(72) Inventors: David Castro Duran, Nezahualcoyotl (MX); Jose Adan Cortina, Mexico City (MX); Nestor Eduardo Rueda, Naucalpan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 16/314,130

(22) PCT Filed: Jul. 1, 2016

(86) PCT No.: PCT/US2016/040613
§ 371 (c)(1),
(2) Date: Dec. 28, 2018

(87) PCT Pub. No.: WO2018/004638
PCT Pub. Date: Jan. 4, 2018

(65) Prior Publication Data
US 2019/0172278 A1   Jun. 6, 2019

(51) Int. Cl.
*G07C 5/12* (2006.01)
*G07C 5/00* (2006.01)
(Continued)

(52) U.S. Cl.
CPC ............. *G07C 5/12* (2013.01); *B64C 39/024* (2013.01); *G05D 1/0011* (2013.01);
(Continued)

(58) Field of Classification Search
CPC ... G07C 5/12; G07C 5/00; G07C 5/08; G07C 5/0825; G07C 5/0833; G07C 5/085; G07C 5/008; G07C 5/0808; G07C 2205/02; G06Q 10/20; B64C 39/024; B64C 2201/12; G05D 1/0011; G05D 1/0223
See application file for complete search history.

(56) References Cited

U.S. PATENT DOCUMENTS 5,448,479 A   9/1995   Kemner et al.
6,056,237 A   5/2000   Woodland
(Continued)

FOREIGN PATENT DOCUMENTS

DE   102014213023 A1   1/2016

OTHER PUBLICATIONS

Gofor: Drones on Demand, http://www.gofordrones.com/, Apr. 7, 2016.
(Continued)

*Primary Examiner* — Marthe Y Marc-Coleman
(74) *Attorney, Agent, or Firm* — Brandon Hicks; Bejin Bieneman PLC (57) ABSTRACT An unmanned aerial vehicle includes a processor and a memory storing instructions executable by the processor. The instructions include receiving diagnostic information from a vehicle, processing the diagnostic information to diagnose a vehicle failure, and outputting repair instructions for addressing the vehicle failure. A corresponding method is also disclosed.

18 Claims, 4 Drawing Sheets (51) Int. Cl.
*G06Q 10/00* (2012.01)
*B64C 39/02* (2006.01)
*G05D 1/00* (2006.01)
*G05D 1/02* (2020.01)
*G07C 5/08* (2006.01)

(52) U.S. Cl.
CPC .......... *G05D 1/0223* (2013.01); *G06Q 10/20* (2013.01); *G07C 5/00* (2013.01); *G07C 5/008* (2013.01); *G07C 5/08* (2013.01); *G07C 5/085* (2013.01); *G07C 5/0808* (2013.01); *G07C 5/0825* (2013.01); *G07C 5/0833* (2013.01); *B64C 2201/12* (2013.01); *G07C 2205/02* (2013.01)

(56) References Cited

U.S. PATENT DOCUMENTS

| | | |
|---|---|---|
| 8,229,462 B2 | 7/2012 | Bennett, Jr. |
| 8,983,682 B1 | 3/2015 | Peeters et al. |
| 9,053,588 B1 | 6/2015 | Briggs et al. |
| 9,170,117 B1 | 10/2015 | Abuelsaad et al. |
| 2005/0267632 A1* | 12/2005 | Waita ............ G06T 7/001 700/245 |
| 2008/0119981 A1 | 5/2008 | Chen |
| 2012/0173120 A1 | 7/2012 | Kaufman et al. |
| 2015/0324720 A1 | 11/2015 | Briggs et al. |
| 2016/0016663 A1 | 1/2016 | Stanek et al. |
| 2016/0093212 A1 | 3/2016 | Barfield, Jr. et al. |
| 2016/0129999 A1 | 5/2016 | Mays |
| 2016/0155097 A1 | 6/2016 | Venkatesha |
| 2016/0185466 A1 | 6/2016 | Dreano, Jr. |
| 2017/0154536 A1* | 6/2017 | Kreiner ............ G06Q 10/00 |
| 2020/0160728 A1* | 5/2020 | Speasl ............ G08G 5/0069 |

OTHER PUBLICATIONS

Prime Industries, The Innovative Use of Drones in Aircraft Maintenance and Repair, http://primeindustriesusa.com/drones-in-aircraft-maintenance/, Jan. 30, 2016.

International Search Report and Written Opinion dated Sep. 30, 2016 re Appl. No. PCT/US2016/40613.

* cited by examiner

ROADSIDE ASSISTANCE WITH UNMANNED AERIAL VEHICLE

BACKGROUND

Vehicle operations are becoming increasingly complex. Certain vehicle operations rely on sophisticated computing while others rely on highly technical mechanical interactions. Roadside assistance is sometimes available when a vehicle operation fails.

DETAILED DESCRIPTION

Roadside assistance sometimes involves requesting a service truck. The response time of the service truck may depend on various conditions such as the weather, traffic conditions, the distance of the service truck to the vehicle, the number of pending calls for the service truck, etc. Thus, waiting for roadside assistance could be inconvenient for occupants of a vehicle who are already frustrated by the vehicle system failure. Sometimes, the vehicle system failure can be addressed with a minor repair that can be performed by a vehicle occupant given the appropriate instructions, parts, or both. Such instructions and parts, however, are often not available until the service truck arrives.

One solution includes using an unmanned aerial vehicle (i.e., a drone) to fly to the vehicle, identify the cause of the failure, and provide instruction and supplies, if necessary, to help the occupant address the failure without having to wait for a service truck. The drone may be in a better position to arrive at the vehicle location faster than a service truck and provide support at a lower cost than more traditional methods of roadside assistance.

To properly diagnose the issue with the vehicle, the drone may be programmed to receive diagnostics information from the vehicle, process the diagnostics information, identify a failure in the vehicle, and provide solutions for the identified failure. The solutions may include repair instructions provided to the occupant of the vehicle, parts to repair the issue, or both. For instance, if the drone determines that the issue involves a blown fuse, the drone may provide a replacement fuse and present instructions for replacing the blown fuse with the replacement fuse. If the drone is not equipped with the appropriate parts, or if it cannot diagnose the issue, the drone may request a cargo drone with the appropriate parts or a more traditional roadside assistance service truck.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
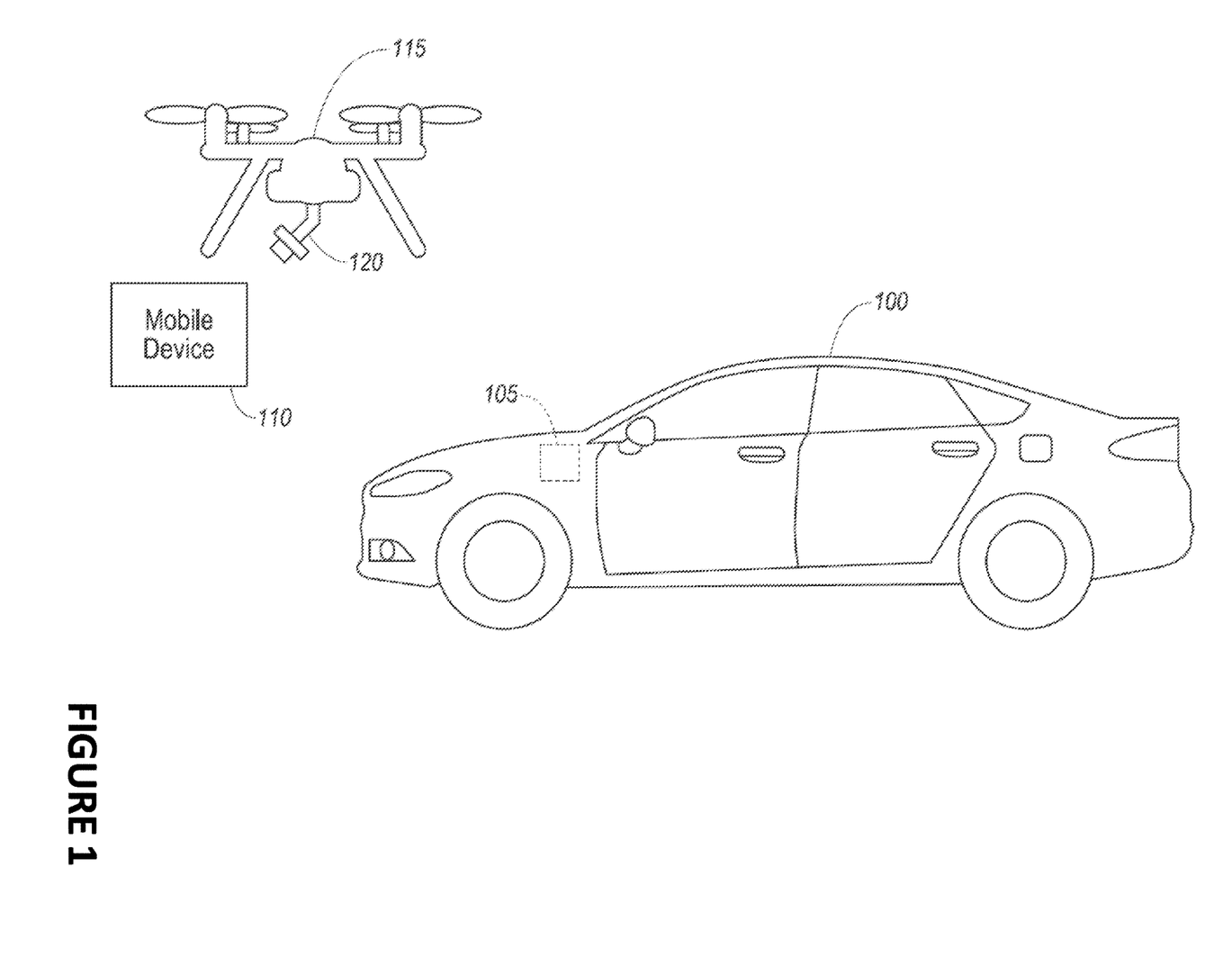
FIG. 1 illustrates an example host vehicle with a system for interfacing with an unmanned aerial vehicle and a mobile device.

Figure illustrates a host vehicle 100 with a vehicle system 105, a mobile device 110, and an unmanned aerial vehicle (i.e., a drone) 115. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that operates in an autonomous (e.g., driverless) mode, a partially autonomous mode, and/or a non-autonomous mode.

The vehicle system 105 is implemented via circuits, chips, or other electronic components that can allow the host vehicle 100 to communicate with the drone 115, the mobile device 110, or both. For example, the vehicle system 105 may provide any number of communication interfaces that facilitate communication with the drone 115, allowing the drone 115 to transmit signals to, and receive messages from, various components of the host vehicle 100. Signals provided by the vehicle system 105 to the drone 115 may include diagnostic information. Signals received by the vehicle system 105 may include instructions for addressing various failures identified by the drone 115. In some possible approaches, the vehicle system 105 may be programmed to contact the drone 115 (either directly or via the mobile device 110), determine the location of the host vehicle 100, communication the location of the host vehicle 100 to the drone 115, etc.

The vehicle system 105 may further allow occupants to send roadside assistance requests directly from the host vehicle 100. As discussed in greater detail below, the roadside assistance request may be transmitted from a processor and a wireless communication interface inside the passenger compartment of the host vehicle 100. For instance, the occupant may use a vehicle infotainment system to transmit the roadside assistance request. The roadside assistance request may be sent directly to a drone 115 or to a service center, e.g., processors in a roadside assistance company, car manufacturer dealership, etc., that can dispatch a drone 115 to the host vehicle 100.

The mobile device 110, such as a mobile phone or tablet processor, may be used by an occupant of the host vehicle 100 to communicate with the host vehicle 100, the drone 115, or both, in accordance with a mobile communication protocol, e.g., 3G, 4G, LTE, etc. For example, when roadside assistance is needed, the occupant may provide a user input that causes the mobile device 110 to send the request for roadside assistance to the drone 115. The roadside assistance request includes a location of the host vehicle 100, which may be inferred from the location of the mobile device 110 or received from the host vehicle 100. The location, therefore, may be based on location data received from a geolocation sensor, such as a built-in global positioning system (GPS) sensor, associated with the mobile device 110 or the host vehicle 100. Additionally, the roadside assistance request may include other information about a host vehicle 100 failure. Such other information, to the extent known by the user of the mobile device 110, may include symptoms of the failure, supplies for addressing the failure, etc.

For communicating with the host vehicle 100 or other nearby objects, the mobile device 110 may communicate in accordance with a short range wireless communication protocol such as Bluetooth®, Bluetooth® Low Energy, Dedicated Short Range Communication (DSRC), WiFi, or the like. The direct communication between the mobile device 110 and the host vehicle 100 may allow the mobile device 110 and the host vehicle 100 to exchange information. Further, the communications between the mobile device 110 or the host vehicle 100 and the drone 115 may facilitate precise landing of the drone 115 near or on the host vehicle 100. That is, the drone 115 may establish a short range communication link to the mobile device 110 in order to accurately locate the host vehicle 100 prior to landing.

The drone 115 may include any number of electrical circuits and components that allow the drone 115 to fly to the host vehicle 100 and diagnose and help resolve issues associated with the host vehicle 100. Other operations performed by the drone 115 may include determining that the occupant of the host vehicle 100 requires assistance, determining the location of the host vehicle 100, and navigating to the host vehicle 100. When the drone 115 arrives at the location of the host vehicle 100, the drone 115 may communicate with the host vehicle 100 via a wired or wireless communication interface. An example of a wired vehicle communication interface 120 includes an On-Board Diagnostics interface OBD-II. An example of a wireless communication interface includes Bluetooth®, Bluetooth® Low Energy, Dedicated Short Range Communication (DSRC), WiFi, or the like. Further, the communications between the drone 115 and the host vehicle 100 may facilitate a precise landing of the drone 115 near or on the host vehicle 100. That is, the drone 115 may establish a short range communication link to the mobile device 110 in order to accurately locate the host vehicle 100 prior to landing.

Upon receiving the assistance request either directly from the host vehicle 100 or from a service center processor, the drone 115 may be dispatched to the host vehicle 100. Additionally, the drone 115 may be sent with supplies to the host vehicle 100. The drone 115 may be stocked with a predetermined set of supplies or may include particular supplies if, e.g., the roadside assistance request includes information identifying a particular problem or identifies particular supplies that are needed to address the problem.

Prior to being dispatched to the host vehicle 100, the drone 115 may be parked in an allocated area. The allocated area may be associated with a service center, dealership, gas station, etc. Further, strategically parking drones 115 can reduce the travel time of the drone 115 to the host vehicle 100. For instance, instead of parking all drones 115 at one location, drones 115 may be parked at various locations relative to a particular area, and the closest parked drone 115 may respond to the roadside assistance request.

When dispatched, the drone 115 may navigate to the location of the host vehicle 100. The drone 115 may determine the location of the host vehicle 100 from the location data included in the roadside assistance request and a navigation map or map database. When the drone 115 arrives at the location of the host vehicle 100, the drone 115 may land near or on the host vehicle 100. Further precision for purposes of landing may be obtained via short-range communication between the drone 115 and the mobile device 110, the host vehicle 100, or both.

After the drone 115 lands, the occupant of the host vehicle 100 may connect the drone 115, in accordance with a wired or wireless communication protocol, to the vehicle system 105 to initiate a diagnostic test. That is, once connected, the drone 115 may receive diagnostic trouble codes from the host vehicle 100. If the drone 115 is able to identify the failure from the diagnostic trouble codes, the drone 115 may provide instructions on how to repair. The instructions may be provided inside the host vehicle 100 (e.g., via the infotainment system), via the mobile device 110, or directly by the drone 115 via a display screen, speakers, etc.

Depending on the nature and extent of the failure, the drone 115 may provide supplies for repairing the host vehicle 100, take over one or more functionalities of the host vehicle 100 to allow the host vehicle 100 to travel a service center (i.e., serve as the vehicle processor), or request a service truck for the host vehicle 100.

The service center may provide various interfaces for a service technician in the service center to monitor and approve actions in different stages of roadside assistance. Examples of such interfaces may include laptop or desktop computers, tablet computers, smartphones, etc. The service technician in service center may, through user inputs, dispatch drones 115 or service trucks, approve requests for the drone 115 to take over one or more vehicle functions, monitor status of ongoing roadside assistances, or the like. Each service truck may include an on-board computer that can communicate with the service centers or the drones 115 via a telecommunications protocol. The information provided by the service center may be based on information received from the mobile device 110, the drone 115, etc.

Figure 2:
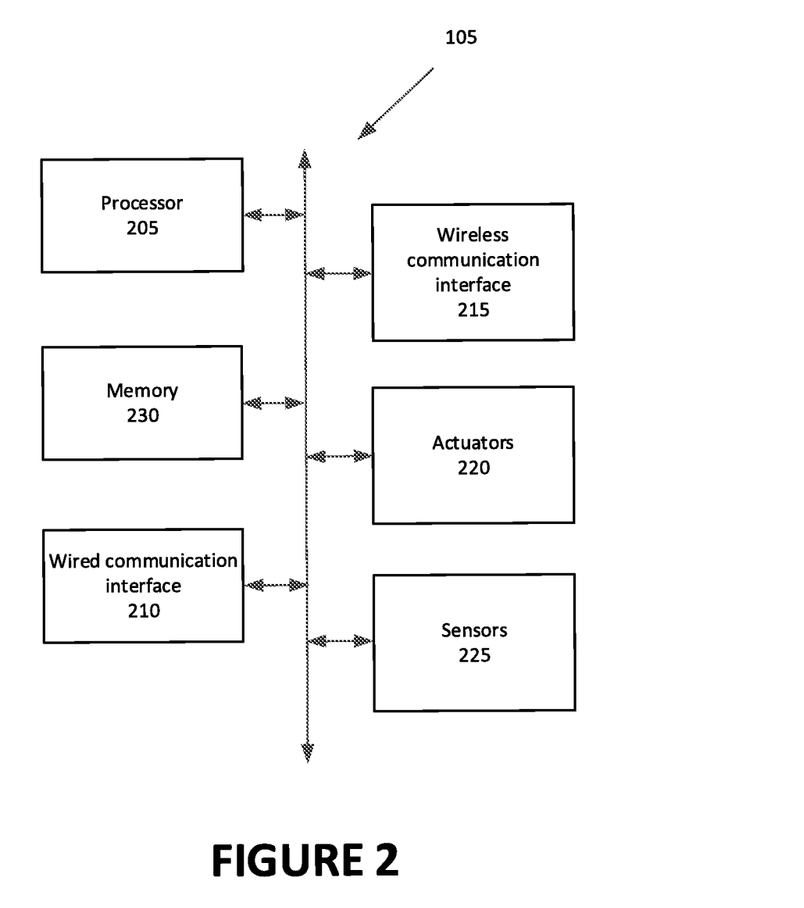
FIG. 2 illustrates example components of the system incorporated into the host vehicle.

Referring now to FIG. 2, the vehicle system 105 may include a processor 205, a vehicle wired communication interface 210, a vehicle wireless communication interface 215, actuators 220, and sensors 225.

The sensors 225 are implemented via circuits, chips, or other electronic components that can collect data and output signals representing the data collected. Examples of sensors 225 may include, e.g., a geolocation (GPS) sensor providing a location of the host vehicle 100, a vision sensor such as a camera providing image data of the interior or exterior of the host vehicle 100, or the like. The sensors 225 may output signals to various components of the vehicle system 105, such as the processor 205.

The actuators 220 are implemented via circuits, chips, or other electronic components that can actuate various vehicle subsystems in accordance with appropriate control signals. For instance, the actuators 220 may be implemented via one or more relays, servomotors, etc. The actuators 220, therefore, may be used to control braking, acceleration, and steering of the host vehicle 100. The control signals used to control the actuators 220 may be generated by the processor 205, a control unit located in the host vehicle 100, or a control unit located in the drone 115.

The wired communication interface 210 is implemented via circuits, chips, or other electronic components that allow the vehicle system 105 to communicate with the drone 115. For instance, the wired communication interface 210 may include a hardware interface that complies with the on-board diagnostic (OBD) protocol. For instance, the wired communication interface 210 may include a plug or a socket for receiving an OBD-II compliant connector.

The wireless communication interface 215 is implemented via circuits, chips, or other electronic components that allow the vehicle system 105 to communicate with the drone 115, the mobile device 110, or both. For instance, the wireless communication interface 215 may include an antenna and a chip that can transmit messages to, and receive messages from, the drone 115, the mobile device 110, etc., in accordance with a wireless communication protocol. Examples of wireless communication protocols may include Bluetooth®, Bluetooth® Low Energy, Dedicated Short Range Communication (DSRC), WiFi, or the like.

The processor 205 is implemented via circuits, chips, or other electronic components that can receive and process signals output by various components of the vehicle system 105. For example, the processor 205 may receive and process signals received from the sensors 225, the wired communication interface 210, and the wireless communication interface 215 and output signals to the actuators 220, the wired communication interface 210, and the wireless communication interface 215.

The processor 205 may communicate with other components of the host vehicle 100 over a communications network. For instance, the processor 205 may communicate with one or more other processors, controllers, electronic control units (ECUs), or the like via the communication network. Examples of controllers may include a powertrain controller, a brake controller, a steering controller, etc. Examples of ECUs may include a powertrain ECU, a steering ECU, etc., which may be communicatively coupled to the actuators 220 and sensors 225. Examples of a communication network may include controller area network (CAN), Ethernet, or other wired or even wireless communication protocols.

The processor 205 includes a memory 230. The memory 230 includes one or more forms of processor-readable media, and stores instructions executable by the processor 205 for performing various operations. The memory 230 may be physically packaged within the processor 205 or external to, but in communication with, the processor 205, e.g. through a data bus on a printed circuit board. Examples of operations stored in the memory 230 and executable by the processor 205 may include instructions for providing diagnostic information to the drone 115 or to a diagnostics tester in a dealership. The processor 205, for instance, may output diagnostic information to the drone 115 via, e.g., the wired communication interface 210 or the wireless communication interface 215. The diagnostics information may be provided based on various communication protocols, e.g., Unified Diagnostics Services (UDS). The processor 205 may receive UDP from the drone 115 with a request for diagnostic trouble codes (DTC). The processor 205 or another component communicating over a communication network in the host vehicle 100 may respond to the drone 115 request by reporting the status of the vehicle diagnostic trouble codes. For example, a diagnostic trouble code may indicate that no electric power is supplied to one or more electric consumers in the host vehicle 100. The drone 115 may include instructions to process this information and output repair instructions, which may, for example, include instructions for replacing a particular fuse.

Additional instructions executed by the processor 205 may include generating signals to operate one or more of vehicle brakes, propulsion (e.g., control of acceleration in the host vehicle 100 by controlling one or more of an internal combustion engine, electric motor, hybrid engine, etc.), steering, climate control, interior and/or exterior lights, etc., as well as to determine whether and when the processor 205, as opposed to a human operator, is to control such operations.

Thus, in the case of certain vehicle failures, the processor 205 may permit the drone 115 to take over one or more vehicle functions. That is, the processor 205 may output a signal to the drone 115 indicating that the drone 115 has permission to function as a controller of the host vehicle 100. The processor 205 may receive control signals from the drone 115 via the wired communication interface 210 or the wireless communication interface 215, authenticate the control signals, and pass the control signals to the actuators 220 via the communication network. To authenticate the control signal, the processor 205 may request that the drone 115 satisfies certain security requirements before passing the control signals to the actuators 220. In some instances, occupant intervention may be required for the host vehicle 100 to process the control signals output by the drone 115. That is, the occupant may need to provide various credentials to the host vehicle 100, the mobile device 110, or both before the processor 205 will pass the control signals to the actuators 220.

By passing the control signals from the drone 115 to the actuators 220, the drone 115 can navigate the host vehicle 100 to a service center for repair. In such a scenario, the processor 205 may permit the drone 115 to receive data from the vehicle sensors 225, process the sensor data, and transmit a control signal to the actuators 220 associated with the steering, braking, or throttle of the host vehicle 100. Alternatively, such actuating messages may be sent to an ECU of the host vehicle 100, which may also be connected to an actuator 220.

Figure 3:
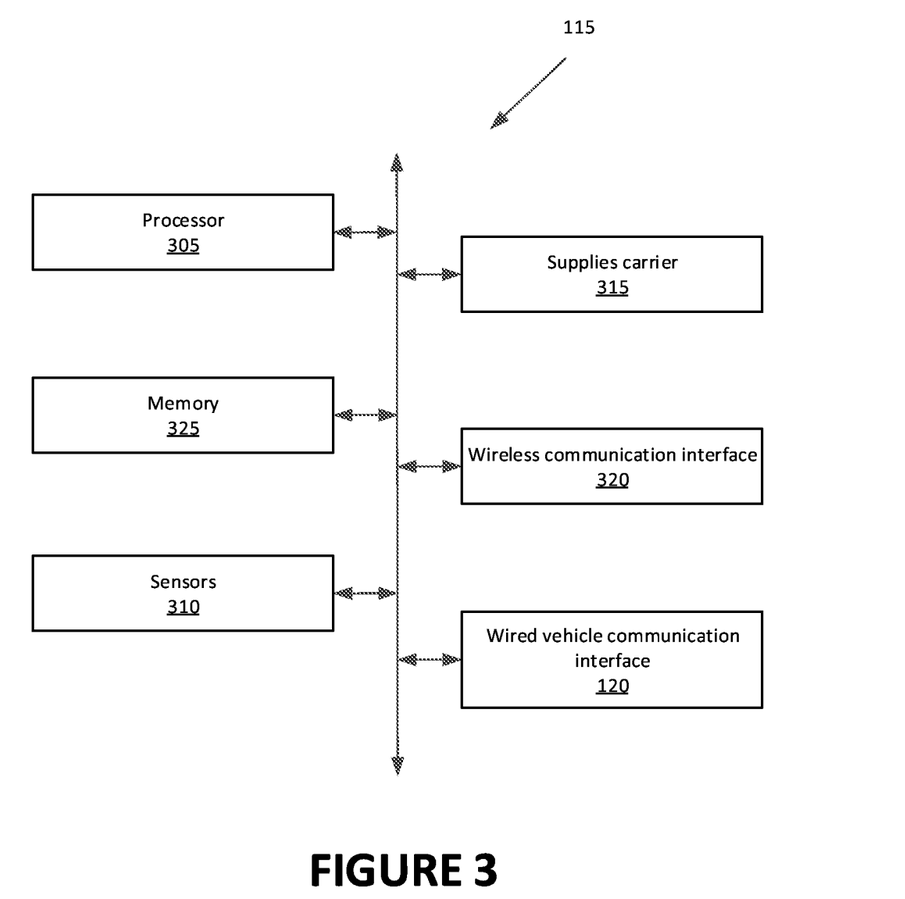
FIG. 3 illustrates example components of the unmanned aerial vehicle.

FIG. 3 illustrates example components of the drone 115. The drone 115 may include a drone processor 305, sensors 310, a supplies carrier 315, the wired vehicle communication interface 120, and a wireless communication interface 320. Although illustrated as a quadcopter (see FIG. 1), the drone 115 may be any type of unmanned aerial vehicle such as a dual copter, helicopter, etc.

The drone sensors 310 are implemented via circuits, chips, or other electronic components that can collect data and output signals representing the data collected. Examples of drone sensors 310 may include, e.g., a gyroscope for drone 115 flight control, a GPS sensor for providing a location of the drone 115, and a vision sensor such as a camera. The image data from a camera may be used for detecting the host vehicle 100 during landing and/or for diagnostics or support purposes during roadside assistance.

The supplies carrier 315 may be implemented via one or more storage sections such as containers, bins, drawers, etc. The supplies carrier 315 can hold supplies, tools, spare parts, etc., that may be used to repair various types of vehicle failures. Examples of supplies include spare parts such as fuses, spark plugs, hoses, belts, etc. Some supplies carriers 315 may contain fluids such as engine coolant, windshield washer fluid, gasoline, engine oil, or the like. Tools may include a socket wrench and sockets, a tire iron, or the like.

Each drone 115 may have multiple supplies carriers 315 of varying types. Likewise, different drones 115 may have different types of supplies carriers 315. That is, small drones may not carry any supplies, and therefore, may not be equipped with a supplies carrier 315. Medium drones may include small supplies carrier 315 suitable for transporting small supplies. Large cargo drones may include large supply carriers 315 for transporting larger supplies. Large cargo drones, and possibly medium drones, may include multiple supplies carriers 315 of varying sizes. For instance, a large cargo drone may have multiple large and small supply carriers. Each supplies carrier 315 may include multiple sections for holding different items. The supplies carrier 315 may include an opening actuator, such as a solenoid, controlled via a signal from the drone processor 305 to open one or more sections of the supplies carrier 315.

The wired vehicle communication interface 120 includes circuits or other electronic components that allow the drone 115 to communicate with the host vehicle 100 through the wired communication interface 210 of the host vehicle 100. For instance, the wired communication interface 120 may include a hardware interface that complies with the on-board diagnostic (OBD) protocol. For instance, the wired communication interface 120 may include a plug or a socket for receiving an OBD-II compliant connector. The wired vehicle communication interface 120 may be coupled to the drone 115 via a retractable cable, i.e. retractable inside the drone 115. For instance, the occupant of the host vehicle 100 may pull the wired vehicle communication interface 120 to an extended position in order to connect to the vehicle wired communication interface 210.

The drone wireless communication interface 320 is implemented via circuits, chips, or other electronic components that can allow the drone 115 to communicate with the service center, the host vehicle 100, the mobile device 110, or another drone 115. For instance, the wireless communication interface 320 may include an antenna and a chip that can transmit and receive messages according to a wireless communication protocol. Examples of wireless communication protocols may include 3G, 4G, LTE, Bluetooth®, Bluetooth Low Energy®, Dedicated Short Range Communication (DSRC), WiFi, or the like.

The drone processor 305 includes a memory 325. The memory 325 includes one or more forms of processor-readable media, and stores instructions executable by the drone processor 305 for performing various operations. The memory 325 may be physically packaged within the drone processor 305, or disposed externally communicating to the drone processor 305, e.g. through a data bus on a printed circuit board. Examples of operations stored in the memory 325 and executable by the drone processor 305 may include instructions for navigating to the host vehicle 100, receiving diagnostic information from the host vehicle 100, processing the received diagnostics information, outputting repair instructions, sending requests for a service truck and/or another drone 115, e.g., a cargo drone, and take over host vehicle 100 functions.

Instructions executable by the drone processor 305 for navigating the drone 115 may include receiving a dispatch request, e.g., from the service center, the mobile device 110, or the host vehicle 100, and flying to the location of the host vehicle 100, which may be identified in the dispatch request. Further, the navigation of the drone 115 may include taking off and landing near or on the host vehicle 100 in accordance with data received from the drone sensors 310. As one example, the service center processor may receive the requests from the host vehicle 100 or mobile device 110, and forward the requests to a suitable drone, e.g., dispatching a cargo drone or a medium drone, if supplies are requested, otherwise dispatching a small drone not equipped with a supplies carrier 315. As another example, the dispatch requests are received by a drone 115 from the host vehicle 100 or the mobile device 110 directly, then the drone processor 305 may evaluate whether the request can be fulfilled by the drone 115, or should be forwarded to another drone 115 or the service center. For example, a cargo drone may be requested carrying specific supplies, when supplies requested.

Instructions executable by the drone processor 305 for receiving diagnostics information from the host vehicle 100 may include multiple subsets of instructions for detecting whether there is a connection between the drone 115 and the host vehicle 100, transmitting requests for diagnostics information, and receiving diagnostics information from the host vehicle 100. Additional details about these instructions are described is greater detail below with respect to FIG. 4.

Instructions executable by the drone processor 305 for detecting a connection to the host vehicle 100 may include detecting that, e.g., the wired communication interface 210 of the host vehicle 100 is electrically connected to the wired communication interface 120 of the drone 115. For example, the drone processor 305 may execute instructions to cyclically verify whether any data traffic is received at, e.g., the wired communication interface 120 of the drone 115. Instructions for detecting the connection may further include identifying the diagnostics protocol used by the host vehicle 100. Various diagnostics protocols may be implemented depending on manufacturing year, country, etc. The drone processor 305 may be programmed to support various communication protocols used in different host vehicles 100.

Instructions executable by the drone processor 305 for transmitting requests for diagnostic information may be based the identified diagnostic protocol implemented in the host vehicle 100. An example of one such protocol is the Unified Diagnostics Services (UDS) protocol. The drone processor 305 may be programmed to transmit UDS messages to the host vehicle processor 205 with a request for diagnostic trouble codes and receive one or more responses from the vehicle processor 205 via the vehicle wired communication interface 210. The drone processor 305 may be programmed to transmit the request in response to detecting the wired connection between the drone 115 and the host vehicle 100 and receive the diagnostics information, which may include the diagnostics trouble codes status, from the host vehicle 100.

Further, the drone processor 305 may be programmed to process the received diagnostics information. Such instructions may include identifying a failure in the host vehicle 100, i.e. a root cause, causing the technical problems, for example, by analyzing the received diagnostics information based on so called fault trees, and identifying a solution. Fault trees typically specify relationships between diagnostics trouble codes, failures, and solutions. The fault trees may further include test cases to identify the failure, e.g., when a diagnostics trouble code may be logged due to more than one failure. A test case specification may include actuating an actuator 220, e.g., turning on a light of the host vehicle 100, measuring an amount of current consumed by the light, and determining whether the light is functional, e.g., if the measured amount of consumed current is greater than 100 mA. The instructions for processing the received diagnostics information executable by the drone processor 305 may implement such test cases to identify the failure in the host vehicle 100.

The drone processor 305 may be further programmed to identify a solution for the vehicle failure based on the results of processing the received diagnostic information. The solution may be identified from the information provided by the fault trees. Additionally or alternatively, identifying the solution may include communication with the service center, e.g., a service technician communicating through a user interface in the service center. For example, the drone processor 305 may be programmed to transmit a request for a solution to the service center. The request may include the received diagnostics information. The drone processor 305 may receive a response from the service center that includes a proposed solution.

The drone processor 305 may be programmed to output repair instructions to the occupant of the host vehicle 100. Outputting repair instructions may include generating a supplies list (i.e., identifying particular parts associated with implementing the identified solution), retrieving or presenting supplies from the supplies carrier 315, and communicating with the occupant.

Instructions executable by the drone processor 305 to provide supplies may include selecting a section, e.g., a drawer, of the supplier carrier 315 based at least in part on the generated supplies list, and generating an actuating signal to open the selected section of the parts carrier, e.g., an electrical signal to a solenoid mechanically coupled to a drawer latch. In some possible implementations, the drone processor 305 may further transmit a request for another drone 115, such as a cargo drone, to deliver supplies to the host vehicle 100.

The drone processor 305 may be further programmed to communicate with the occupant. Communicating with the occupant may include presenting instructions on a display device located inside the host vehicle 100, on the mobile device 110, or on the drone 115 itself. Communicating with the occupant may further or alternatively include outputting audio signals to a speaker located inside the host vehicle 100, on the mobile device 110, or on the drone 115. The communication with the occupant may therefore include displaying or presenting verbal instructions for executing the repair. In some instances, communication with the occupant may be interactive. For instance, the drone processor 305 may be programmed to prompt the occupant for information and receive responses from the occupant in the form of a user input provided to a user interface located inside the host vehicle 100, provided to the mobile device 110, or provided to a user interface incorporated into the drone 115. Further, if certain aspects of the repair were unsuccessful, the communication with the occupant may include the drone processor 305 outputting additional repair suggestions via one of the user interfaces discussed above. The additional repair suggestions may include requesting the occupant to perform additional steps, prompting the occupant to provide additional information, or the like.

As stated above, the drone processor 305 may be programmed to send requests for a service truck or possibly another drone 115 when, e.g., the drone processor 305 is unable to determine a solution to the failure or the occupant is unable to successfully execute the repair instructions. The request for a service truck may be transmitted in response to the drone processor 305 commanding the wireless communication interface 320 to send a message, with the request, to a particular service center. The request may include the location of the host vehicle 100 and the diagnostic information received from the host vehicle 100. The drone processor 305 may command the wireless communication interface 320 to address the request to a computer located at the service center so a service technician at the service center can review the request and dispatch a service truck to the host vehicle 100. Alternatively, the request may be handled by the computer located at the service center, meaning that the computer may automatically dispatch the service truck to the location of the host vehicle 100 without human intervention. Instead of a service center, the drone processor 305 may command the wireless communication interface 320 to send the request directly to a service truck, such as the nearest available service truck. Alternatively, the drone processor 305 may address the request to another drone 115, such as a drone 115 that is better equipped to respond to the particular issue with the host vehicle 100. For instance, if the drone processor 305 determines that the drone 115 is not equipped to handle the issue with the host vehicle 100, the drone processor 305 may command the wireless communication interface 320 to transmit a request to another drone 115 to provide additional assistance.

In some instances, resolving the issue with the host vehicle 100 may include the drone 115 assuming certain vehicle controls. Thus, the drone processor 305 may be programmed to execute one or more functions of the host vehicle 100 that would normally be handled by an in-vehicle processor. Prior to assuming vehicle controls, the drone processor 305 may be programmed to download object code associated with the particular vehicle control from the service center or other online resource. Alternatively, an online software service may carry out the expected function. For instance, a remote processor at, for example, the service center, a cloud server of vehicle manufacturer, etc., could execute instructions for controlling the host vehicle 100 and transmit various commands to the host vehicle 100 through the drone 115. In this example, the drone processor 305 may collect sensor data from the vehicle sensors 225 and other ECUs, transmit the collected data to the remote processor, receive actuating data from the remote processor, and forward the actuating data to vehicle actuators 220, ECUs, etc. Additionally, in order to take over the expected functionality, the drone processor 305 may output signals to disable malfunctioning electronic circuitry or components. For example, a malfunctioning ECU may send faulty messages over the vehicle communication network. Taking over the expected functionality, therefore, may include the drone processor 305 disabling the malfunctioning ECU to prevent such messages from being communicated over the vehicle communication network. Disabling the malfunctioning circuit or component may include, e.g., the drone processor 305 sending a disabling command to the malfunctioning circuit or component, turning off a power supply of the malfunctioning ECU if possible, etc.

Figure 4:
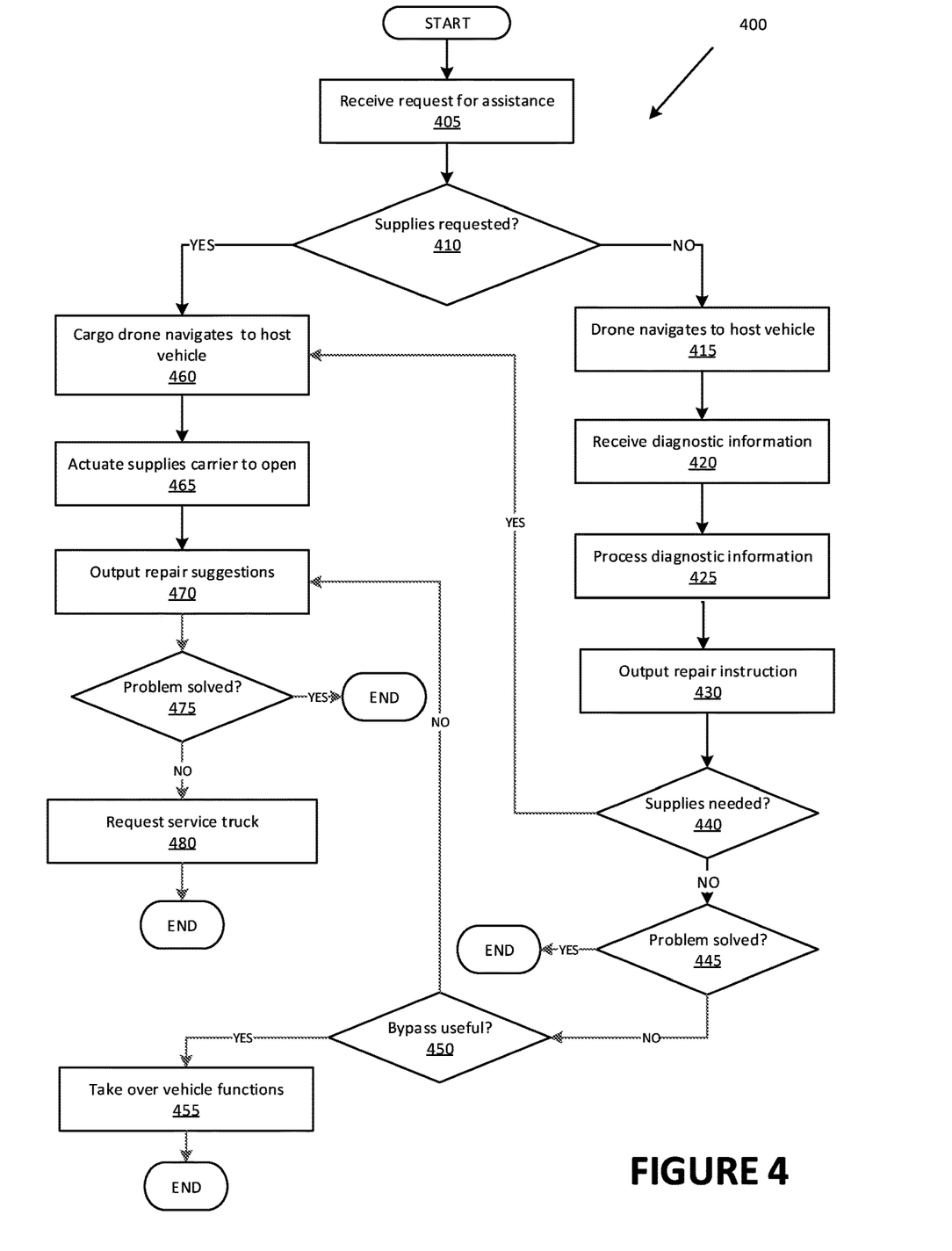
FIG. 4 is a flowchart of an example process that may be executed by the unmanned aerial device.

FIG. 4 is a flowchart of an example process 400 for providing roadside assistance to the host vehicle 100. Some blocks, such as blocks 405 and 410 of the process 400 may be executed by a processor located at the service center, while other blocks of the process 400 may be executed by the drone processor 305. The process 400 may be initiated at any time while the processor at the service center and the drone processor 305 are operating and the drone 115 is able to be dispatched to a host vehicle 100. The drone processor 305 may continue to operate until the drone 115 is turned off or no longer in service.

At block 405, the service center processor receives a request for roadside assistance. The roadside assistance request may be transmitted from a vehicle processor through a vehicle wireless communication interface 215 inside the passenger compartment of the host vehicle 100. For instance, the occupant may use a vehicle infotainment system or a mobile device 110 to generate and transmit the roadside assistance request. The service center processor may receive the roadside assistance request via a communication interface located at the service center.

At decision block 410, the service center processor determines whether any supplies are identified in the roadside assistance request. For instance, supplies may be included in the roadside assistance request if the occupant knows the cause of the failure or has otherwise requested particular supplies to address the failure. In response to determining that no or minimal supplies are requested, the process 400 may proceed to block 415. If more substantial supplies are needed, the process 400 may proceed to block 460.

At block 415, the drone processor 305 receives dispatch information from the service center processor. The dispatch information may include data indicating the location of the host vehicle 100 requesting the road side assistance. The drone processor 305 navigates the drone 115 to fly to the host vehicle 100. For example, the drone processor 305 may output commands that navigate the drone 115 to the host vehicle 100 and that cause the drone 115 to land near to or on the host vehicle 100 based at least in part on the information included in the request.

At block 420, the drone processor 305 requests diagnostic information from the host vehicle 100. The diagnostic information may include diagnostics trouble codes and may be received via a wired or wireless communication interface such as an OBD-II interface. The drone processor 305 may receive the diagnostics information transmitted by a host vehicle processor in response to the request for diagnostics information received from the drone processor 305.

At block 425, the drone processor 305 processes the received diagnostic information to identify a failure in the host vehicle 100. Thus, processing the diagnostic information may identify a root cause of the failure. The drone processor 305 may process the diagnostic information by analyzing the received diagnostics information and identifying a solution in accordance with the fault trees as discussed above.

At block 430, the drone processor 305 outputs repair instructions according to the solution identified at block 425. Outputting the repair instructions may include transmitting visual or audio signals to a remote device such as a display or a speaker located in the host vehicle 100, a mobile device 110, or the drone 115 itself. Outputting the repair instructions may further include the drone processor 305 generating a supplies list based on the solution identified at the block 425.

At decision block 440, the drone processor 305 determines whether supplies needed to complete the repair of the host vehicle 100. The drone processor 305 may make this determination based on the supplies list received at block 410. For instance, the service center processor may transmit the supplies list to the drone processor 305 or otherwise identify to the drone processor 305 which supplies, if any, are or may be needed at the host vehicle 100. If supplies are needed, the process 400 proceeds to block 460. Otherwise, the process 400 proceeds to block 445.

At decision block 445, the drone processor 305 determines whether the technical problem identified at the block 425 has been resolved. For example, the drone processor 305 may transmit a request for diagnostics information to the host vehicle 100 via the wired vehicle communication interface 120 or the wireless communication interface 320. The drone processor 305 may process data received from the host vehicle 100 processor in response to the request for diagnostics information and determine whether the previously identified failure is resolved. One way for the drone processor 305 to determine whether the identified failure is resolved is if a previously active diagnostics trouble code, such as the trouble code identified at block 420, has been cleared. Additionally or alternatively, the drone processor 305 may request information from the occupant. The request may prompt the occupant for confirmation of a successful repair and may be presented via the mobile device 110, a display located in the passenger compartment of the host vehicle 100, a display on the drone 115, etc. If the technical problem is not resolved, then the process 400 proceeds to block 450. Otherwise the process 400 ends.

At decision block 450, the drone processor 305 determines whether a control function of the host vehicle 100 can be taken over by the drone processor 305. For instance, the drone processor 305 may determine whether it can temporarily serve as the vehicle processor to allow the host vehicle 100 to travel to the service center or other repair facility. This decision may be subject to the type of identified failure in the host vehicle 100. For instance, the drone processor 305 may be able to temporarily act as a malfunctioned electronic computing component of the host vehicle 100 but not a failed hardware component such as an actuator. If the drone processor 305 determines that such take over by the drone processor 305 is the most appropriate course of action, the process 400 may proceed to block 455. Otherwise, the process 400 may proceed to block 470.

At block 455, the drone processor 305 assumes control of one or more functions of the vehicle and navigates the host vehicle 100 to, e.g., a service center or other repair facility. The drone processor 305 may execute one or more functions of the host vehicle 100 that would normally be handled by an in-vehicle processor. As discussed above, the drone processor 305 may download the object code from a remote location such as the service center or a cloud-based server. Alternatively or in addition, the drone processor 305 may control the host vehicle 100 according to processing performed by an online software service that processes various sensor signals and transmits commands to the drone processor 305 to carry out the expected function. At block 455, the drone processor 305 may further output signals to disable malfunctioning electronic circuitry or components. The process 400 may end after block 455.

At block 460, a cargo drone processor 305 receives dispatch information from the service center processor, navigates the cargo drone by outputting command signals to fly the cargo drone to the host vehicle 100, and outputs command signals to land the cargo drone near to or on the host vehicle 100. The dispatch information may include data indicating the location of the host vehicle 100 requesting the road side assistance. The cargo drone may carry the supplies identified in the service request (see block 405) or identified in the generated supplies list (see block 430). The supplies carrier 315 of the cargo drone may hold the supplies.

At block 465, the cargo drone processor 305 actuates an opening actuator, such as a solenoid, to open one or more sections of the supplies carrier 315. For instance, the cargo drone processor 305 may output a signal to the opening actuator, and the opening actuator may open the supplies carrier 315 in accordance with the received signal. The actuating of one or more sections of the supplies carrier 315 may at least partially depend on the identified supplies in the service request (see block 405) or the generated supplies list (see block 430).

At block 470, the cargo drone processor 305 outputs repair suggestions to the occupant of the host vehicle 100. The repair suggestions may include instructions for replacing one or more components of the host vehicle 100 according to the specifications of the supplies provided to the occupant at the block 465. In addition, or in the alternative, the repair suggestions may include prompting the occupant of the host vehicle 100 to perform additional steps, prompting the occupant to provide additional information, or the like. The repair suggestions may be provided through a mobile device 110, through a user interface in the host vehicle 100, or through a display or speakers of the drone 115.

At decision block 475, the cargo drone processor 305 determines whether the technical problem has been solved. For example, the cargo drone processor 305 may transmit a request for diagnostics information to the host vehicle 100 via the wired vehicle communication interface 120 or the wireless communication interface 320. The cargo drone processor 305 may process data received from the host vehicle processor 205 in response to the request for diagnostics information and determine whether the previously identified failure is resolved. One way for the cargo drone processor 305 to determine whether the identified failure is resolved is to determine whether any diagnostic trouble codes are active. Additionally or alternatively, the drone processor 305 may request information from the occupant. The request may prompt the occupant for confirmation of a successful repair and may be presented via the mobile device 110, a display located in the passenger compartment of the host vehicle 100, a display on the cargo drone, etc. If the cargo drone processor 305 determines that the technical problem has not been resolved, the process 400 may proceed to block 480. If the problem has been resolved, the process 400 may end.

At block 480, the drone processor 305 requests a service truck. Requesting the service truck may include the cargo drone processor 305 transmitting a signal through the drone 115 wireless communication interface to the service center. The request for the service truck may include information about the location of the host vehicle 100 and a diagnostics status of the host vehicle 100. The service center processor may receive and process the service truck request from the drone processor 305 and transmit, if necessary, upon approval of a service technician in the service center, a request to a service truck on-board computer including the location of the host vehicle 100, the diagnostic status, or both. The on-board computer of the service truck may output instructions to a display and/or a speaker located in the service truck. Such instructions may be used by a service truck driver to navigate the service truck to the location of the host vehicle 100. Instead of requesting a service truck, block 480 may alternatively include the drone processor 305 determining whether it can assume control of one or more functions of the host vehicle 100 and navigate the host vehicle 100 to, e.g., a service center or other repair facility. As discussed above with respect to block 455, this could include drone processor 305 executing one or more functions of the host vehicle 100 that would normally be handled by an in-vehicle processor. The process 400 may end after block 480.

All terms used in the claims are intended to be given their ordinary meanings as understood by those knowledgeable in the technologies described herein unless an explicit indication to the contrary is made herein. In particular, use of the singular articles such as "a,", "the,", etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An unmanned aerial vehicle comprising a computer that includes a processor and a memory storing instructions executable by the processor, the instructions including:
   receiving diagnostic information from a host vehicle;
   processing the diagnostic information to diagnose a vehicle failure associated with the host vehicle; and
   outputting repair instructions for addressing the vehicle failure, wherein the repair instructions further include instructions to:
      disable a vehicle electronic control unit by sending a command from the unmanned aerial vehicle to the vehicle electronic control unit; and
      then assume, by the unmanned aerial vehicle, control of one or more functions of the disabled vehicle electronic control unit.

2. The unmanned aerial vehicle of claim 1, wherein the diagnostic information includes at least one diagnostic trouble code status.

3. The unmanned aerial vehicle of claim 1, wherein the diagnostics information is received via a wired OBD-II interface.

4. The unmanned aerial vehicle of claim 1, wherein processing the diagnostic information includes identifying a solution to the vehicle failure based on the diagnostic information.

5. The unmanned aerial vehicle of claim 4, wherein repair instructions include a supplies list generated in accordance with the identified solution.

6. The unmanned aerial vehicle of claim 5, wherein the instructions include:
   selecting a section of a parts carrier based at least in part on the supplies list; and
   generating an actuating signal to open the selected section of the parts carrier.

7. The unmanned aerial vehicle of claim 1, wherein outputting the repair instructions includes transmitting a signal to a remote device.

8. The unmanned aerial vehicle of claim 1, wherein outputting the repair instructions includes transmitting an audio signal to a speaker.

9. The unmanned aerial vehicle of claim 1, further comprising a display device and wherein outputting the repair instructions includes presenting the repair instructions on the display device.

10. The unmanned aerial vehicle of claim 1, wherein outputting the repair instructions includes transmitting the repair instructions to the vehicle for presentation on a display device associated with the vehicle.

11. The unmanned aerial vehicle of claim 1, further comprising transmitting a signal to a service center.

12. The unmanned aerial vehicle of claim 11, wherein the signal to the service center includes a request for a service truck.

13. The unmanned aerial vehicle of claim 11, wherein the signal to the service center identifies a location of the vehicle, and the instructions further include instructions to establish a short range communication link to a mobile device in the vehicle and to locate the vehicle further based on the established short range communication link.

14. The unmanned aerial vehicle of claim 1, wherein the instructions further include instructions to download object code for vehicle control including controlling at least one of accelerating, braking, and steering of the vehicle and operate the vehicle based on the downloaded object code.

15. The unmanned aerial vehicle of claim 14, wherein the instructions further include receiving sensor data from a second unmanned aerial vehicle.

16. An unmanned aerial vehicle comprising:
   a wired vehicle communication interface;
   a wireless communication interface;
   a parts carrier having an opening actuator;
   a navigation system;
   a processor and a memory storing instructions executable by the processor, the instructions to:
      receive diagnostic information from a host vehicle;
      process the diagnostic information to diagnose a vehicle failure associated with the host vehicle; and output repair instructions for addressing the vehicle failure, wherein the repair instructions further include instructions to:
  disable a vehicle electronic control unit by sending a command from the unmanned aerial vehicle to the vehicle electronic control unit; and
  then assume, by the unmanned aerial vehicle, control of one or more functions of the disabled vehicle electronic control unit.

17. A method comprising:
receiving, via an unmanned aerial vehicle, diagnostic information from a vehicle;
processing, via the unmanned aerial vehicle, the diagnostic information to diagnose a vehicle failure; and
outputting repair instructions for addressing the vehicle failure, further comprising:
  disabling a vehicle electronic control unit by sending a command from the unmanned aerial vehicle to the vehicle electronic control unit; and
  then assuming, by the unmanned aerial vehicle, control of one or more functions of the disabled vehicle electronic control unit.

18. The method of claim 17, further comprising:
controlling at least one vehicle function of accelerating, braking, and steering of the vehicle.

* * * * *

UNITED STATES PATENT AND TRADEMARK OFFICE
CERTIFICATE OF CORRECTION

| | | |
|---|---|---|
| PATENT NO. | : 11,004,281 B2 | |
| APPLICATION NO. | : 16/314130 | |
| DATED | : May 11, 2021 | |
| INVENTOR(S) | : David Castro Duran | |

It is certified that error appears in the above-identified patent and that said Letters Patent is hereby corrected as shown below:

In the Claims

Claim 5, Line 1: after "wherein", insert --the--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*